United States Patent [19]

Rumaner et al.

[11] Patent Number: 5,281,487
[45] Date of Patent: Jan. 25, 1994

[54] THERMALLY PROTECTIVE COMPOSITE CERAMIC-METAL COATINGS FOR HIGH TEMPERATURE USE

[75] Inventors: Lee E. Rumaner, Schenectady; Dennis M. Gray, Delanson; Richard L. Mehan, Scotia; John R. Rairden, III, Schenectady, all of N.Y.

[73] Assignee: General Electric Company, Schenectady, N.Y.

[21] Appl. No.: 441,597

[22] Filed: Nov. 27, 1989

[51] Int. Cl.⁵ ................................ B22F 3/00
[52] U.S. Cl. ..................... 428/552; 428/565; 428/667; 428/668; 428/680; 428/681; 428/689; 428/472.2
[58] Field of Search ............ 428/552, 565, 667, 668, 428/680, 681, 689, 472.2

[56] References Cited

U.S. PATENT DOCUMENTS

| | | | |
|---|---|---|---|
| 4,399,199 | 8/1983 | McGill et al. | 428/552 |
| 4,485,150 | 11/1984 | Tsuno | 428/552 |
| 4,871,621 | 10/1989 | Bagley et al. | 428/552 |

Primary Examiner—Stephen J. Lechert, Jr.
Attorney, Agent, or Firm—James Magee, Jr.

[57] ABSTRACT

An improved thermal barrier coating is disclosed. The coating is formed on a metal part to be exposed to high temperature gases. The metal part is first coated with an adherent sublayer of MCrAlY alloy. In this case, the M of the MCrAlY is nickel, cobalt, iron, or some combination of these metals. A diffused layer of MCrAlY combined with a low concentration of mullite is formed over the MCrAlY subcoating and the mullite is increased in concentration as the thickness of the layer increases. The outer surface of the layer is all mullite. Improved life expectancy and decreased thermal conductivity is achieved.

10 Claims, 1 Drawing Sheet

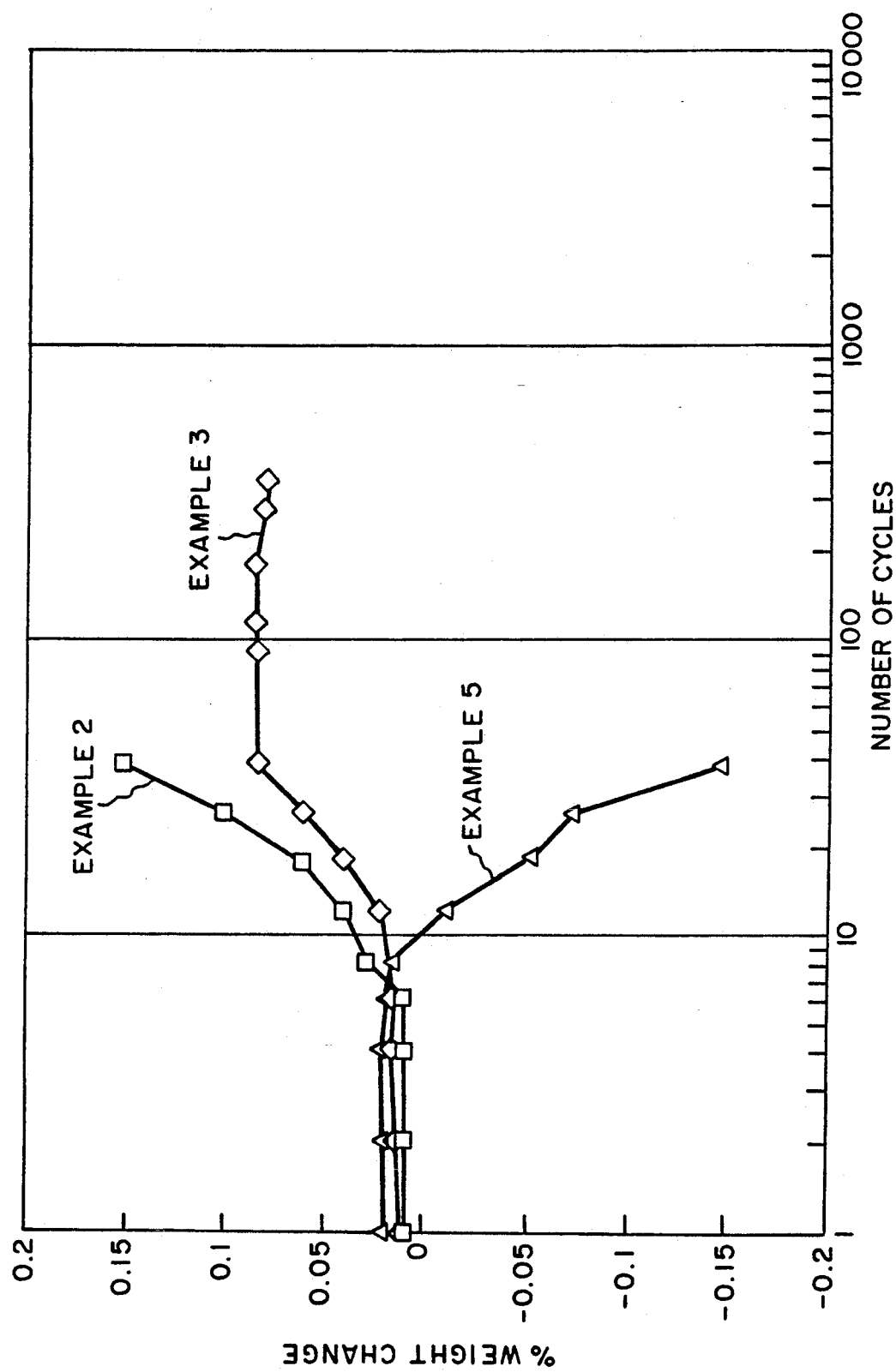

THERMALLY PROTECTIVE COMPOSITE CERAMIC-METAL COATINGS FOR HIGH TEMPERATURE USE

BACKGROUND OF THE INVENTION

The present invention relates generally to the formation of coatings on surfaces which are subjected to high temperature. More particularly, it relates to the formation of protective coatings on metal surfaces in which the coatings inhibit the flow of heat from ambient gases to the metal beneath the coating. These are known in the art as thermal barrier coatings.

It has been known for some time that it was possible to deposit coatings having relatively low thermal conductivity on the exterior of metal parts in jet engines. The object of depositing such coatings is to reduce or limit the flow of heat through the coatings to the engine parts and in this way to permit the temperature of the gas in contact with the coatings of low thermal conductivity to operate at higher temperatures. For example, it is known that plasma spray coatings of partially stabilized zirconia have been under development for many years for jet engine applications. Such coatings may have a composition of 8 weight percent yttrium oxide in a zirconium oxide base. Such coatings are known in the art as YSZ coatings or yttria stabilized zirconia coatings.

A major limitation of the use of this type of coating in jet engine applications is the tendency of such coatings to fail by spallation. One reason for the spallation is that generally coating materials, which might be considered suitable because of their low thermal conductivity, are found to be unsuitable because of their very low thermal expansion relative to the thermal expansion coefficient of the metal substrate on which they are deposited.

Some prior art has been developed which relates to the formation of protective coatings on the parts of gas turbine engines which operate at higher temperatures.

A U.S. Pat. No. 4,005,989 is directed toward the formation of an aluminide on the surface of a metal element and to the overcoating of the aluminide with MCrAlY where M is cobalt, nickel, or iron.

A U.S. Pat. No. 4,246,323 employs NiCrAlY in coating a metal element and then hot isostatically presses the coated element.

U.S. Pat. No. 4,774,149 which is assigned to the same assignee as the subject application deals with nickel base alloys for use in the hot section of gas turbine engines and to use of these alloys in deposited coatings or bonded claddings.

U.S. Pat. No. 3,869,779 deals with the coating of a metallic base with a ductile alloy layer that is oxidation resistant. An aluminide coating is then applied over the metallic alloy layer.

U.S. Pat. No. 4,371,570 discloses a substrate metal with an overlay coating based on iron, nickel or cobalt or mixtures thereof combined optionally with aluminum, yttrium and hafnium. A silicon-rich surface zone is produced at the surface of the overlay coating.

An article entitled "Production of Composite Structures by Low Pressure Plasma Deposition", by Siemers et al., was published in Ceramic Engineering and Science Proceedings, Vol. 6, No. 7-8 (July 1985). It describes the deposition of a variety of coatings on high temperature surfaces. Coatings containing both metal and oxide are described and illustrated.

A paper entitled "Survivability of Thermal Barrier Coatings", by H. Herman, appeared in Material Science and Engineering, Vol. 88 (1987) pages 69-74. This paper dealt with the use of ceramic oxide coatings in conjunction with MCrAlY-type intermediate bond coatings applied over superalloy substrates.

A paper entitled "Current Status of Thermal Barrier Coatings—An Overview", by Robert A. Miller, appeared in Surface and Coatings Technology, Vol. 30 (1987) pages 1-11.

A paper entitled "Thermal Barrier Coatings For Jet Engines Improvement", by G. John Kohner et al., appeared in Thin Solid Films, Vol. 119 (1984) pages 301-315.

These papers describe in detail some efforts which have been made in developing the technology of thermal barrier coatings and a variety of materials which have been employed in the study of such coatings.

The present invention relates to improvements which have been made in the coatings.

BRIEF STATEMENT OF THE INVENTION

It is, accordingly, one object of the present invention to provide novel coating materials which may be employed as thermal barrier coatings.

Another object is to provide combinations of elements in a thermal barrier coating which have novel and useful effects.

Another object is to provide a method of forming a novel and unique thermal barrier coating.

Still another object is to provide a method for improving the operation of jet engines.

Additional objects will be apparent and in part pointed out in the description which follows.

In one of its broader aspects, objects of the present invention can be achieved by forming a combined layer of MCrAlY and mullite on a alloy substrate using a prescribed set of processing conditions. The MCrAlY is deposited directly on the surface of the metal part in a manner which bonds it to the part surface. A graded interface of MCrAlY and mullite is then formed in which the concentration of MCrAlY is decreased as the mullite concentration is increased. The outermost portion of the graded surface is mullite. MCrAlY as described herein can be any of a family of MCrAlY compositions, where M is a metal selected from the group consisting of Ni, Co, Fe, or a combination of these metallic elements.

BRIEF DESCRIPTION OF THE DRAWINGS

The description of the invention which follows will be understood with greater clarity if reference is made to the accompanying drawing in which:

FIG. 1 is a plot of the amount of weight change due to oxidation against the number of cycles to produce that oxidation.

DETAILED DESCRIPTION OF THE INVENTION

The process by which the structures of the invention may be formed is illustrated by a number of examples which are here described:

EXAMPLES 1-3

A sample of mullite powder having particle size of less than 10 μm was obtained from Combustion Engineering Company. A sample of a NiCrAlY powder was obtained from AMI Corporation and the alloy had a composition as follows: Ni-22Cr-10Al-1Y. About 3% (weight percent) fumed silica was mixed with the mullite powder to improve its flowability. One of the two powders was supplied to a first plasma spray gun and the second powder was supplied to the second separate plasma spray gun. The two separate guns were operated simultaneously but independently and were aimed at approximately the same spot on a substrate of René 95 superalloy.

Three distinct forms of deposit were formed as follows:

EXAMPLE 1

A layered coating having alternating layers of NiCrAlY and mullite.

EXAMPLE 2

An intermixed coating of NiCrAlY and mullite.

EXAMPLE 3

A graded coating of NiCrAlY and mullite.

The coating deposits were formed using the two plasma spray guns by programming the guns through a mechanical rotation and reciprocation mode suitable for forming the respective coatings employing the following process conditions.

|  | Intermixed | Graded |
|---|---|---|
| Carrier gas (Ar) flow | 3.76 l/min | 3.76 l/min |
| Primary gas flow | 122.20 l/min | 122.20 l/min |
| Secondary gas (He) flow | 31.96 l/min | 31.96 l/min |
| Volts | 43.00 volts | 43.00 volts |
| Current | 1800.00 A | 1800.00 A |
| Pressure | 0.08 atm | 0.08 atm |
| Powder feeder (NiCrAlY) | 1.20 rpm | 9.0 to 0.0 rpm |
| Powder feeder (Mullite) | 6.00 rpm | 3.0 to 6.0 rpm |
| Gun to substrate distance | 31.75 cm | 31.75 cm |
| Substrate speed | 762.00 cm/mi | 762.00 cm/min |
| Length of deposition | 3.00 min | 3.00 min |

The programming of the gun motion can be done manually or by computer controlled motion equipment where it is available or by some combination of these two types of motion.

For the layered coating of Example 1, the programming needed is a sequential application of a first layer by a first gun, followed by application of a second layer by a second gun, and then a third layer by the first gun, and so on until a multi-layer structure is built up. This can be done very simply by mounting the first and second guns in parallel in stationary side-by-side positions and by then moving the substrate to be coated back and forth in reciprocal fashion into the plasma of each of the guns. By reciprocating the substrate, a separate layer is applied by each gun as the substrate passes through the plasma of that gun.

The programming for the intermixed structure involves simultaneously positioning and pointing both guns at the same deposit zone, so that their deposits intermix, and moving the deposit zone over the area to be coated with the two guns continuously aimed into the same deposit zone as the zone is moved and with the two guns simultaneously plasma spraying deposit into the zone.

The graded coating is prepared by first depositing an adherent layer of the NiCrAlY metal employing the first gun onto the surface of the metal article to be coated, serving as a substrate. After an appreciable layer has been built up, the second gun is applied to depositing mullite simultaneously with the deposit of NiCrAlY. A gradation of deposit is formed by increasing the mullite rate of deposit as the rate of deposit of NiCrAlY is decreased.

After a graded layer has been laid down and the NiCrAlY rate of deposit has substantially diminished, the supply of NiCrAlY to the first gun is terminated but the supply of mullite to the second gun is continued. A substantially pure layer of mullite is formed over the graded midlayer of the composite graded deposit.

Following the deposit of the respective layers, the thermal diffusivities of the combined NiCrAlY/mullite coatings were measured using a laser flash diffusivity technique on 1.27 centimeter diameter by 0.1 centimeter thick specimens. The conductivities were then calculated by multiplying times their specific heat and density. The three specimens were measured:

firstly, the layered coating having alternating layers of mullite and NiCrAlY;

secondly, the coating of intermixed NiCrAlY and mullite;

thirdly, the graded coating. The results of the thermal conductivity tests are listed in Table I.

TABLE 1

| Ex. | Coating | Thermal Conductivity W/mK | Cycles to Crack Initiation | Failure |
|---|---|---|---|---|
| 1 | Alternating Layers 30% Mullite/ 70% NiCrAlY | 10.8 | 0 | 0 |
| 2 | Intermixed 50% NiCrAlY/ 50% Mullite | 7 | 18 | 45 |
| 3 | Graded 50% NiCrAlY/ 50% Mullite | 6.9–12 | 500 | — |
| 4 | Intermixed 50% NiCrAlY/ 50% Al₂O₃ | 10.5 | 800 | — |
| 5 | YSZ on a NiCrAlY Bond Coat | 1.1 | 28 | 40 |

Table I also contains the thermal conductivity values for intermixed composition containing 50% NiCrAlY and 50% $Al_2O_3$. In addition, the thermal conductivity for conventional thermal barrier material, YSZ is listed where YSZ is monolithic $ZrO_2$-8%$Y_2O_3$.

These data show that the intermixed NiCrAlY/mullite coating has a thermal conductivity of 7 W/mK and this value is about 30% lower than the thermal conductivity value for the intermixed NiCrAlY/$Al_2O_3$ coating which is approximately 10.5 W/mK. The thermal conductivity of the graded mullite coating increased as the temperature increased and ranged from about 6.9 to 12 W/mK.

In addition to the testing of the thermal conductivity, the thermal cyclic oxidation lifetime was also measured. This cycle consisted of 50 minutes in a furnace at 1100° C. followed by 10 minutes out of the furnace during which weight change was measured. Each cyclic oxidation sample was prepared by spraying on a René 95 substrate which had been prepared with a NiCrAlY bond coat. The results of the thermocyclic oxidation lifetime test are shown in FIG. 1.

In addition to the thermal conductivity and thermal cyclic oxidation lifetime testing, there was a simultaneous testing of crack initiation and failure. The results of the testing of the crack initiation and failure are also reported in Table I.

A number of observations can be made based on the testing which is described above.

In the case of the layered structure of Example 1, a tendency to delaminate was observed.

In the case of the YSZ layer, a decrease of weight of the YSZ was observed and this decrease is plotted in FIG. 1. The decrease is due to spallation from the surface as the coating oxidized.

The graded mullite coating morphology had a durability lifetime more than an order of magnitude better than that of the YSZ layer.

The intermixed NiCrAlY/mullite coating morphology had a 30% lower thermal conductivity than the intermixed $NiCrAlY/Al_2O_3$.

What is claimed is:

1. A thermal barrier structure which comprises
a layer of MCrAlY alloy,
a graded layer of MCrAlY and mullite which has a higher concentration of MCrAlY adjacent the MCrAlY layer and a higher concentration of mullite more remote from the MCrAlY layer, and
an outer layer of mullite,
the M of said structure being at least one metal selected from the group consisting of Ni, Co, Fe, and combinations of said metals.

2. The thermal barrier structure of claim 1, in which the coating was formed by plasma deposition.

3. The thermal barrier structure of claim 1, in which the M is nickel.

4. The thermal barrier structure of claim 1, in which the M is cobalt.

5. The thermal barrier structure of claim 1, in which the M is iron.

6. A thermal barrier coating structure which comprises
a substrate metal to which the coating is applied,
an inner layer of adherent MCrAlY alloy bonded to the surface of the substrate metal,
a graded layer of MCrAlY and mullite which has a higher concentration of MCrAlY adjacent the adherent MCrAlY layer and a higher concentration of mullite more remote from the adherent MCrAlY layer, and
an outer layer of mullite,
the M of said coating being at least one metal selected from the group consisting of Ni, Co, Fe, and combinations of said metals.

7. The thermal barrier coating of claim 6, in which the coating was formed by plasma deposition.

8. The thermal barrier coating structure of claim 6, in which M is nickel.

9. The thermal barrier coating of claim 6, in which M is cobalt.

10. The thermal barrier coating of claim 6, in which M is iron.

* * * * *